INVENTOR.
FRED A. HASSMAN
EDGAR D. VANCIL
BY Leigh W. Wright
ATTORNEY.

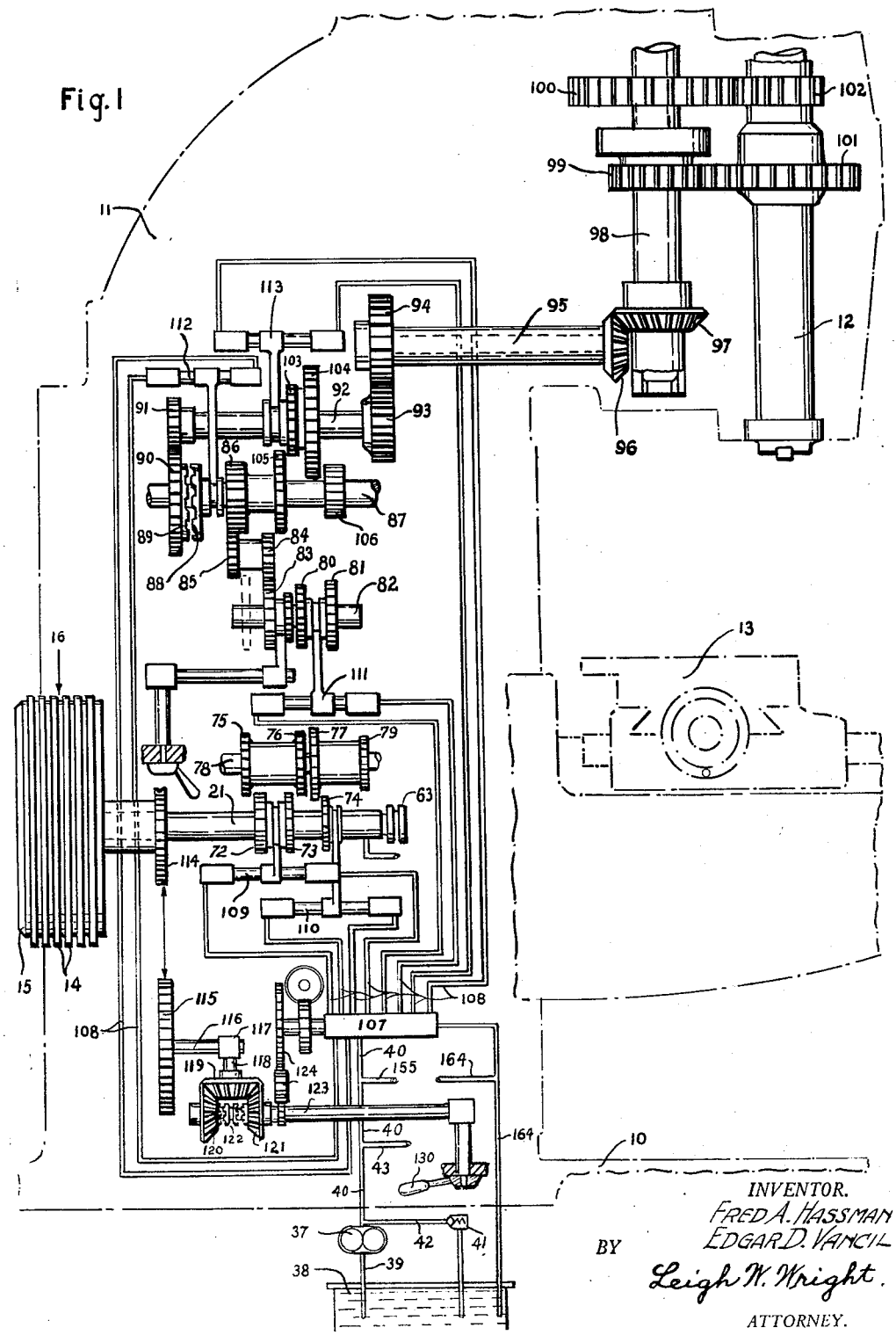

Patented Jan. 9, 1951

2,537,409

UNITED STATES PATENT OFFICE 2,537,409

JOGGING MECHANISM FOR MACHINE TOOLS

Fred A. Hassman and Edgar D. Vancil, Cincinnati, Ohio, assignors to The Cincinnati Milling Machine Co., Cincinnati, Ohio, a corporation of Ohio Application July 29, 1944, Serial No. 547,196

11 Claims. (Cl. 192—3.5)

This invention relates to machine tools and more particularly to improvements in operating control mechanisms for milling machines.

One of the objects of this invention is to improve the operation and control of a milling machine whereby changes in a change speed transmission thereof may be effected quietly, quickly, and efficiently.

An additional object of this invention is to provide in conjunction with a power operable rate change mechanism for a machine tool transmission improved and simplified means for automatically imparting a slow rate of rotation to the transmission to assist intermeshing of the gears and thereby facilitate rate changes therein.

Another object is to provide in a machine tool simplified and improved safety features, preventing damage or breakage of the rate change elements of the machine, which function automatically and without attention on the part of the operator other than that normally required for effecting a desired change of rate.

Still another object of this invention is to provide a common motion transmitter and control mechanism for power connecting a prime mover with a variable speed transmission of a milling machine which may be adjusted and utilized for either transmitting a low torque sufficient to impart a slow idling rotation to the transmission during gear shifting periods or for transmitting full driving torque during working periods.

Another object of this invention is to provide means whereby the main driving clutch of a milling machine may be utilized for normal power driving of a variable speed transmission for working purposes or for slow speed driving of the transmission for gear shifting purposes and thereby eliminating the expense of special or auxiliary drive mechanism for the latter purpose.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention Referring to the drawings in which like reference numerals indicate like or similar parts:

Figure 1 is a diagram of a representative milling machine change speed transmission, having a power operated speed changing mechanism associated therewith, to which this invention is particularly adapted.

Figure 3:
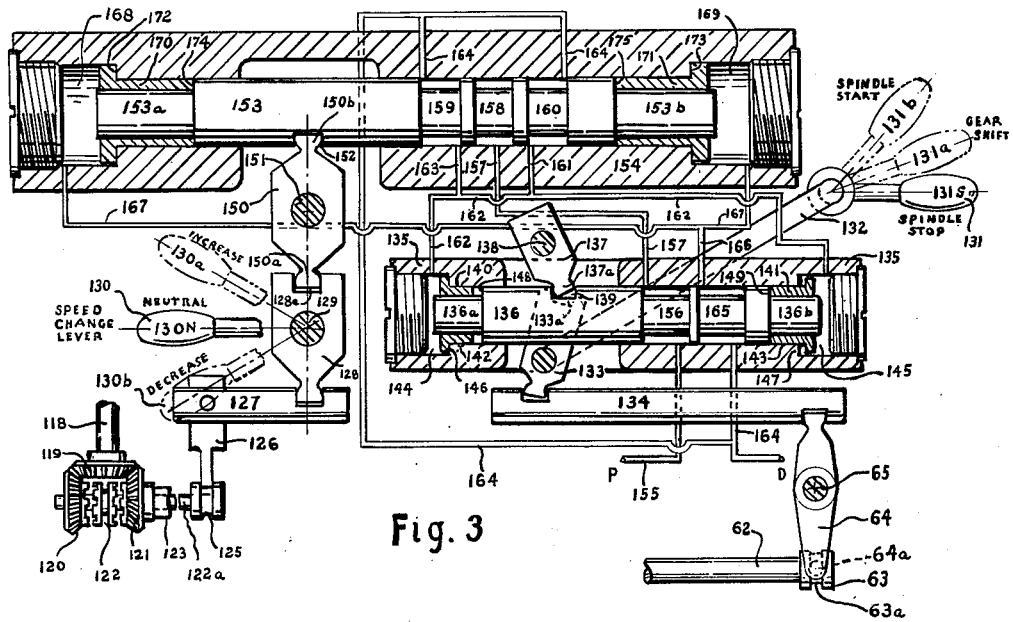
Figure 3 is a hydraulic circuit diagram of the hydraulic control and interlocking mechanism of this invention.

This invention is well adapted to a change speed transmission driven from a prime mover through a variable slip power coupling or main drive friction clutch. More particularly, it is a purpose to provide a hydraulic control and interlocking mechanism whereby the main drive clutch is held in a predetermined semi-engaged position to provide a drag or slipping drive connection to effect rotation of the transmission at a relatively slow predetermined speed whenever its various gears are being shifted to effect speed changes. It is furthermore the purpose to arrange an interlocking mechanism which will neutralize and lock out a speed change control mechanism when the main drive clutch is in or moved to a fully engaged position. In this way a predetermined sequential operation of the main drive clutch and the speed changing mechanism is attained. While this invention is generally adapted to any type of change speed transmission meeting the above specifications, for illustrative purposes, this invention is shown applied to a change speed transmission of a milling machine comprising a base 10, Figure 1, having an integral column 11 carrying the cutter spindle 12 and the work carrying structure 13.

It is desirable to drive the cutter spindle 12 at a plurality of different speeds in order to readily adjust the machine to the particular character of the work material being machined and the diameter of the cutter mounted on the cutter spindle. The cutter spindle 12 is driven by a suitable change speed transmission which, in this instance, comprises a sliding gear and clutch transmission driven by a suitable motor or prime mover (not shown) which delivers power continuously through appropriate belts 14 to the driving pulley 15 of a main drive clutch designated generally at 16. Thus, the main drive pulley in effect constitutes a prime mover to drive the transmission. The purpose of the main drive clutch 16 is to gradually engage the prime mover to drive the transmission or to disengage the prime mover therefrom and arrest rotation of the transmission, the clutch momentarily operating as an infinitely variable speed transmission under these conditions. Any suitable type of clutch to meet these requirements may be utilized and preferably may consist of a friction type of clutch down in Figure 2. The driving pulley 15 is rigidly mounted on a sleeve 17 by appropriate screws 18, the sleeve in turn being journaled in suitable bearings 19 in the column 11 of the machine so that it may be at all times constantly rotated by the prime mover.

Power for driving the cutter spindle 12 is obtained from the constantly rotating pulley 15 through a friction clutch assembly comprising a driving plate 20 rigidly mounted on the pulley drive shaft 21 to which it is attached by a suitable set screw 22. In the sleeve 17 is cut an internal gear 23 in which nicely fits a composition friction plate or disc 24. This plate may be forced into frictional driving engagement with the driving clutch plate 20 by the movable clutch plate 25 having an internal gear 26 formed in its bore upon which it is slidingly mounted on a mating gear 27 formed on the fixed member 20.

Toggle actuating means is provided for forcing the plate 25 toward the plate 20 to grip the composition friction disc 24 between them to provide a driving connection from the pulley 15 to the output drive shaft 21. This means comprises the swinging toggle arms 28 pivotally mounted on suitable pins 29 in an adjustable yoke 30 carried on the clutch member 20. Suitable friction reducing rollers 31 and 31a are provided in the ends of these toggles 28 to provide ease in operating the clutch when forcing the plate 25 toward the plate 20. A suitable actuating cam 32 having a tapered surface 32a engaging the outer rollers 31 of the toggles 28 is mounted by its bore 33 to slide axially on the drive shaft 21 to cause the toggles to ride up on the tapered surface 32a for engaging the friction clutch and to allow them to move down on the surface 32a when disengaging the clutch.

The cam member 32 is connected to a push rod 34 by a suitable connection indicated generally at 35 so that as the rod 34 is moved axially back and forth in a suitable bore 36 provided in the shaft 21 the member 32 will be operated to effect engagement or disengagement of the main drive friction clutch.

Servo-clutch operating mechanism which may be of any conventional type, may be used to actuate the push rod 34, such, for example, that shown in U. S. Letters Patent 1,938,780, issued December 12, 1933, and may comprise a hydraulic actuating mechanism including a fluid pressure pump 37, Figure 1, which receives fluid pressure from a reservoir 38 through a suction line 39 and delivers fluid under pressure to the main pressure line 40. Pressure is maintained within uniform desired limits in the line 40 by means of a relief valve 41 connected to the line 40 through a branch line 42. Fluid pressure from the line 40 is connected through a branch line 43 to an annular groove 44 formed in a suitable non-rotating hydraulic connector 45 journaled on the surface 46 of the shaft 21. The annular groove 44 conveys fluid pressure from the pump 37 through passageways 47 formed in the shaft 21 which open into a cylindrical bore 48 formed in the drive shaft 21.

In the bore or cylinder 48 is slidably mounted a piston sleeve 49 to which is rigidly connected a valve sleeve 50 by means of a pin 51. The sleeve 50 in turn is appropriately rigidly connected through a suitable threaded connection 52 to the push rod 34. Also rigidly connected to the piston sleeve 49 by the pin 51 is the brake operating collar 53 which has an abutment surface 54 adapted to be moved into engagement with the multiple disc brake 55 having one group of friction discs rigidly held against rotation in the sleeve 56 rigidly fixed to the column 11 by suitable screws 57 and the other part of the discs attached to rotate with the drive shaft 21. Thus, when this friction brake 55 is operated, rotation of the shaft 21 will be arrested. The pin 51 passes through axially disposed slots 58 formed in the shaft 21 to permit axial movement of the pin 51 relative to the shaft 21. When the pin 51 and braking collar 53 are in the position shown in Figure 2 the main driving clutch will be fully engaged for rotating the shaft 21 and when the collar 53 is moved to the left to cause its abutment surface 54 to engage the discs 55 the shaft 21 will be locked through the friction discs to the column 11 of the machine to thus prevent rotation of the shaft 21.

While any suitable mechanical or other actuating means for moving the push rod 34 may be provided, it is preferable that the reciprocation of the rod 34 and associated sleeves 49 and 50 be accomplished by hydraulic operating and control means in which the fluid pressure from the passageways 47 enters into the right hand chamber 48a of the bore 48 and then passes through the axially disposed passageway 59 formed in the sleeve 50 and from which pressure fluid discharges through a passageway 60 into the annular groove 61 of the servo-control valve plunger 62. This valve plunger has fixed on its outer end an actuating spool 63 which is operated by a suitable control lever 64 with a pin 64a operating in the spool groove 63a, Figure 3. This lever is pivotally mounted on a suitable pin 65 carried in the column 11 of the machine for effecting the starting and stopping of the transmission and cutter spindle 12 of the machine. It will be noted that a suitable clearance slot 66 is provided about the pin 51 to permit independent motion of the plunger 62 relative to the sleeve 50.

Figure 2:
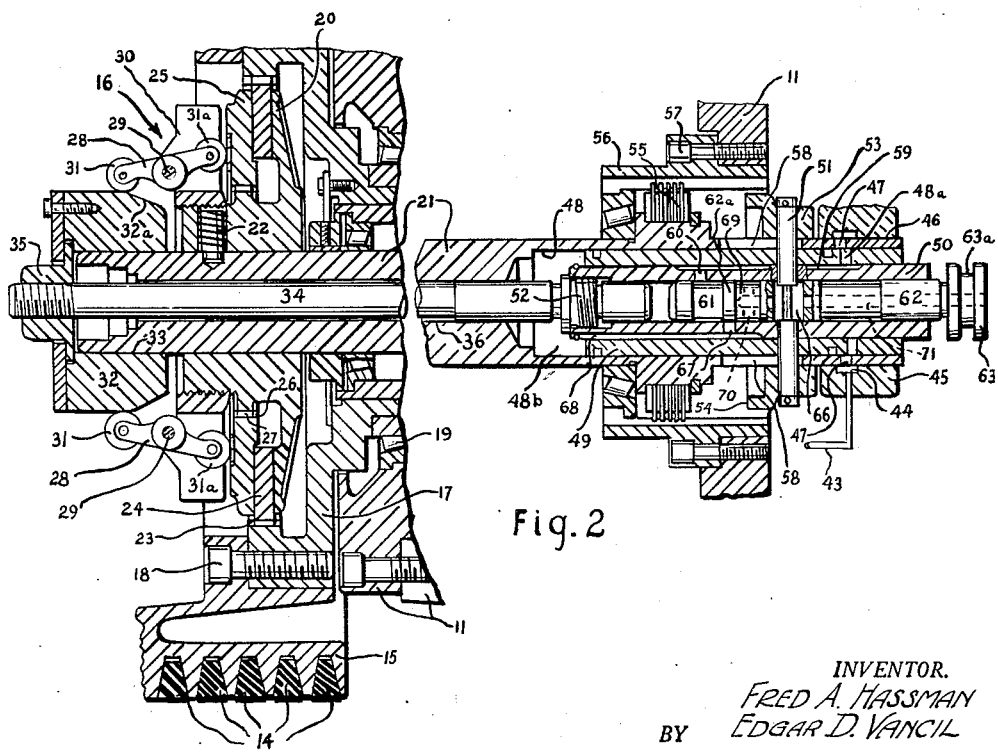
Figure 2 is a fragmentary sectional diagrammatical view of the main drive clutch for connecting or disconnecting the prime mover to the power transmission of Figure 1.

In Figure 2 is shown the position of the parts with the main drive clutch 16 fully engaged with the cutter spindle being driven from the prime mover or driving pulley 15. Under these conditions fluid pressure from the passageway 60 enters into the annular groove 61 of the valve stem 62 and flows out past the spool 62a through a passageway 67 into the passageway 68 formed in the sleeve 50 into the left hand chamber 48b of the cylinder bore 48. The spool 62a is so positioned relative to the port 67 by the recovery servo movement of the sleeve 50 that fluid pressure applied in the chamber 48b balances the effective fluid pressure in the chamber 48a so as to maintain the sleeves 49 and 50 and the push rod 34 in a fixed fully engaged position of the main drive clutch.

To disengage the friction clutch and cause engagement of the discs 55, the spool 63 is actuated to the left, Figure 2, to bring the annular groove 69 of the valve stem 62 into alignment with the port 67 so as to permit escape of fluid from the chamber 48b to decrease the fluid pressure therein below the fluid pressure in chamber 48a through the passageway 68 from where it may discharge through the radial passageways 70 into an axial bore 71 formed in the valve plunger 62 from which it exhausts to drain back to the fluid reservoir 38 from the hydraulic system in any suitable manner. Fluid pressure cannot escape from the port 60 since it is blocked at the annular groove 61 in the valve stem 62 so that the greater pressure in the chamber 48a of the cylinder bore 48 moves the piston sleeve 49 and its associated sleeve 50 and the push rod 34 to the left to thereby disengage the friction clutch and bring the brake collar 53 into engagement with the friction brake 55 to arrest rotation of the transmission and cutter spindle. Again, moving the control spool 63 to the right effects the automatic servo-control as described above for reengaging the main drive friction clutch to any desired degree.

It is to be noted that when the valve plunger 62 is continuously moved to the right, fluid pressure from the supply line 43 is simultaneously applied in the chambers 48a and 48b. Due to the combined areas of the ends of both sleeves 49 and 50 exposed in the chamber 48b being greater than the area of only the end of the sleeve 49 exposed in the chamber 48a the sleeves and push rod 34 will move under fluid pressure in clutch engaging direction. When the plunger 62 is continuously moved to the left, fluid pressure will be released from the chamber 48b while pressure confined in the chamber 48a will move the sleeves and push rod in clutch disengaging direction. By halting the movement of the plunger 62 in any position of its travel in either direction the servo recovery movement of the sleeves relative to the plunger will cause balanced pressures to be set up in the chambers 48a and 48b to maintain the main drive clutch in any semi-engaged position desired. Thus, by positioning the control spool 63 of the valve plunger 62 in any desired intermediate position between these positions just described it is possible to readily effect different degrees of pressure between the clutch plates 20 and 25 and the composition disc 24 to cause slipping or dragging engagement of the clutch 16. In this way a relatively slow rotation of the change speed gear transmission by the prime mover may be accomplished.

The change speed transmission shown in Figure 1 is driven from the drive shaft 21 and includes shiftable change gears 72, 73, and 74 slidably splined in driving relationship on the shaft 21. These gears may be appropriately shifted in proper sequence into engagement with the respective gears 75, 76, and 77 on an intermediate shaft 78 of the change speed transmission. The gear 77 and a gear 79 of the shaft 78 in turn may be engaged by a shiftable pair of gears 80 and 81 so as to effect additional speed changes between the shaft 78 and the shaft 82 carrying the gears 80 and 81. Power from the shaft 82 is transmitted through suitable gearing 83, 84, and 85 to a gear 86 fixed on the shaft 87 also appropriately carried in the column 11 of the milling machine. Power take-off from the shaft 87 may be obtained through engagement of the clutch members 88 and 89 to drive the gear 90 journaled on the shaft 87 which in turn drives a pinion 91 fixed to the drive shaft 92 having an output pinion 93 fixed thereto driving a mating gear 94 of the shaft 95. The latter shaft 95 contains a bevel gear 96 driving a mating bevel gear 97 mounted on a back gear shaft 98 which transmits its power through suitable gearing 99 and 100 to the respective gears 101 and 102 fixed on the cutter spindle 12. Additional speed changes between the shafts 87 and 92 may be readily effected by shifting the compound gear 103 and 104 which may be respectively engaged with the gears 105 and 106 fixed on the shaft 87.

Each of the various gears of this change speed transmission may be actuated in a predetermined sequence to provide the desired changes of speed in an increasing or decreasing progression by a hydraulic gear shifting mechanism preferably of a type for example as shown in U. S. Letters Patent No. 2,012,081, issued August 20, 1935, in which there is provided a selector control valve 107 which may be rotated by power to desired positions to shift the transmission to give the desired rate of rotation to the cutter spindle 12. The selector valve receives fluid pressure from the line 40 from the hydraulic pump 37 and transmits it through a series of control lines 108 which go to the respective fluid pressure gear shifting cylinder mechanisms, 109 for the gears 72—73, 110 for the gear 74, 111 for the gears 80—81, 112 for the clutch 88—89, and 113 for the gears 103—104 which appropriately shift the gears when the selector valve 107 is rotated in a manner as fully set forth in the above-mentioned patent. Power for rotating the control valve 107 may be derived from a gear 114 fixed to and constantly driven by driving pulley 15 as shown in Figure 1, which, in turn, drives a gear 115 carried on a shaft 116 which drives through suitable spiral gearing 117 a shaft 118 having a bevel gear 119 fixed thereon and simultaneously driving mating bevel gears 120 and 121 in opposite directions. A clutch member 122 is provided on a shaft 123 which may be engaged with one or the other of the bevel gears 120 or 121 so as to effect reversing rotation in the shaft 123 or when moved to a neutral position may arrest rotation of the shaft 123. Suitable gearing 124 connects power from the reversible shaft 123 to the control valve 107. Thus, by manipulating the clutch 122 speed changes may be effected in an increasing or decreasing manner or the speed changing mechanism rendered inoperative.

Any suitable control means of conventional design may be utilized to shift the clutch member 122, such as shown in Figure 3, in which a clutch spool 125 is appropriately connected to the clutch 122 through a shifter rod 122a operating coaxially of the shaft 123 and is actuated by means of a shifter yoke 126 carried on a shifter rod 127 which is actuated by a lever arm 128 fixed on a rock shaft 129 journaled in the column 11. On the rock shaft 129 is fixed the speed change lever 130 having a neutral position 130N shown in Figure 3, and movable to a position 130a for effecting increased speed changes by effecting rotation of the selector valve 107 in one direction and having a position 130b for effecting decreasing rates of speed changes by rotation of the selector valve in the opposite direction, this lever being appropriately located in a convenient position on the machine structure.

A suitable control lever 131, Figure 3, is provided in a convenient location on the machine structure for controlling the operation of the main drive clutch 16 through the actuation of the servo-control plunger 62. This spindle control lever 131 is appropriately mounted on a suitable rock shaft 132 journaled in the column 11 and has fixed on it a lever arm 133 operating in a shifter rod 134 to which is connected the lever 64 so that when the control lever is in the position 131S, shown in Figure 3, the plunger 62 will be moved so as to effect complete disengagement of the main drive clutch 16 and when the lever is moved to the position 131b the plunger 62 will be so shifted as to fully engage the main drive clutch 16 as described.

In order to coordinate the motions of the speed change lever 130 and the spindle control lever 131 there is provided a hydraulic interlock and control mechanism, as shown in Figure 3. Associated with the spindle control lever 131 is a positioning control valve 135 having a plunger 136 comprising a hydraulic actuator which is connected to a lever 137 pivotally journaled on a suitable shaft 138 carried in the column 11 of the machine and having an end portion 137a which operates in a suitable notch 139 formed in the valve plunger 136. The end 137a also engages in a slot 133a formed in the lever 133 fixed to the rock shaft 132 to which the spindle stop lever 131 is connected. In this way rocking of the lever 131 effects sliding movement of the plunger 136 in the valve 135. The plunger 136 is prepared with reduced end portions 136a and 136b around which are provided positioning spools 140 and 141, each of which is slidably mounted in bores 142 and 143 respectively in which the valve plunger 136 also slides. Behind the positioning spool 140 and reduced end 136a is provided a pressure chamber 144 and behind the positioning spool 141 and reduced end 136b is provided the pressure chamber 145. When fluid pressure is simultaneously applied in both of the chambers 144 and 145 the valve plunger is positioned in a predetermined intermediate location so as to shift the spindle control lever 131 to a gear shifting position 131a so that the plunger 62 of the hydraulic servo-control for the main drive clutch 16 is positioned to permit a dragging action between the clutch plates 20 and 25 and the composition disc 24 sufficient to cause a relatively slow rotation of the change speed transmission by the prime mover. Under these conditions with pressure in both of the chambers 144 and 145, the spool 140 will be positioned as shown in Figure 3 up against the abutment surface 146 of the valve 135 to stop its axial movement and hold it thereagainst while the positioning spool 141 is moved toward it by pressure in the chamber 145 to cause the plunger 136 to be moved to the left, as shown in Figure 3, at which time the spool 141 will be held against the abutment surface 147, the plunger 136 being confined by its surface 148 against the spool 140 and by its surface 149 against the positioning spool 141 so that it is positively held by hydraulic pressure in the predetermined intermediate gear shifting position with the control lever in position 131a. When no pressure exists in either of the chambers 144 or 145 the plunger 136 is freely slidable in the bores 142 and 143 of the valve 135 so that the spindle lever 131 may be readily moved manually to any desired position.

Associated with the speed change lever 130 is fluid pressure mechanism for actuating the plunger 136 and spindle control lever to the intermediate gear shift position 131a whenever the change speed lever is moved to either of its operative positions 130a or 130b for increasing or decreasing selection of speed changes. This arrangement comprises a lever 150 pivotally mounted on a suitable pin 151 carried in the column 11 of the machine and having one end 150a cooperating with a slot 128a formed in the lever 128 and having its other end 150b cooperating with a suitable notch 152 formed in the hydraulic actuator or plunger 153 of the speed selector interlocking valve 154, so that as the lever 130 is moved to its operative increasing speed position 130a or to its decreasing speed change position 130b, Figure 3, the plunger 153 of the valve 154 will be accordingly axially reciprocated through the levers 128 and 150.

Fluid pressure control means is provided so that whenever the speed change lever 130 is moved to either of its operative positions 130a or 130b pressure will be simultaneously applied to the chambers 144 and 145 of the positioning control valve 135. Fluid pressure for actuating this means is derived from the fluid pressure pump 37, Figure 1, through the line 40 and a branch line 155, Figure 3, which is connected to the valve 135 to an annular groove 156 formed in the valve plunger 136 thereof which is in communication with the pressure line 155 whenever the spindle control lever 131 is in its stop position 131s or in the gear shift position 131a. Under these conditions fluid pressure from the line 155 passes through the annular groove 156 and into a line 157 which, in turn, is connected to the control valve 154. The plunger 153 of this valve has a series of annular grooves 158, 159 and 160 formed in its plunger 153. When the speed change lever 130 is in its inoperative or neutral position, pressure from the line 157 is blocked at the annular groove 158 of the plunger 153. However, when the speed change lever 130 is moved to its increase position 130a pressure from the line 157 will be conducted through the annular groove 160 to the line 161, which, in turn, is connected to the line 162 connected to both the pressure chambers 144 and 145 of the positioning valve 135 so as to simultaneously apply pressure in said chambers to position said valve plunger 136 and the spindle control lever 131 in the gear shift position 131a. Similarly, when the speed change lever 130 is moved to its other or decreasing speed change position 130b pressure from the line 157 will be conducted through the annular groove 159 to the line 163 which also is connected to the common line 162 for the pressure chambers 144 and 145 of the valve 135 to also effect movement of the spindle control lever to the gear shift position 131a.

When the change speed lever 130 is in its neutral position each of the annular grooves 159 and 160 is connected to a suitable drain line 164 so that when the spindle control lever 131 is manually actuated with the speed change lever in neutral position fluid may readily be displaced out of the chambers 144 and 145 to permit freedom of motion of the plunger 136 and therefore unrestricted motion of the spindle control lever 131. Thus, whenever the speed change lever is moved to an operative position, fluid pressure automatically moves the spindle control lever to a semi-engaged clutch position or intermediate gear shifting position 131a and the spindle control lever is positively held in said position so long as speed changes are being effected. It is also to be noted that as soon as the speed change lever is again moved to its neutral or inoperative position the spindle control lever is then freely movable to any desired start or stop position.

This arrangement also provides means for automatically maintaining said speed change lever in its neutral or inoperative position whenever the spindle control lever is manually moved to its fully engaged spindle starting position 131b of full engagement of the main drive clutch 16. When the spindle control lever is so moved to the position 131b, fluid pressure from the line 155 is then connected through an annular groove 165 in the valve plunger 136 to a line 166 connected to the common supply line 167 connected into pressure operating chambers 168 and 169 provided in each end of the valve 154. About each of the reduced end portions 153a and 153b of the valve plunger 153 are the positioning spools 170 and 171 which are so arranged that when pressure is simultaneously applied in the chambers 168 and 169 the spools move against the respective abutment surfaces 172 and 173 provided in the valve body 154 and engage the surfaces 174 and 175 of the plunger 153 so as to centralize this plunger and to positively hold it in the position shown in Figure 3 so that when pressure is thus simultaneously applied in the chambers 168 and 169 by movement of the spindle control lever 131 to the fully engaged spindle start position 131b, the speed change lever 130 cannot be manipulated out of its neutral position. Thus, when the main drive clutch 16 is fully engaged to drive the change speed transmission the speed change lever is locked in neutral against movement. When the spindle control lever 131 is in either its stop position 131s or its gear shift position 131a the line 166 connected to the common line 167 is then connected through the annular groove 165 in the valve plunger 136 of the positioning valve 135, to drain line 164 so that the plunger 153 associated with the speed change lever 130 may readily displace fluid out of the pressure chambers 168 and 169 under these conditions to permit freedom of movement of the speed change lever 130.

There has thus been provided in a machine tool having a change speed transmission which is driven from a source of power through a main drive friction clutch, an arrangement wherein the main drive friction clutch may be partially engaged under slipping conditions to cause a slow speed driving of the change speed transmission during the time speed changes are being made in the transmission. And it is furthermore the purpose of this arrangement to provide interlocking control mechanism between the operating means for the main drive clutch and the operating means for effecting the speed changes in the transmission to limit the actuation of the main drive clutch and the effecting of speed changes in the transmission in a predetermined sequential operating relationship. Thus, the main drive friction clutch provides the sole means for both driving the change speed transmission during the normal machining operations and to provide a slow speed driving movement to the transmission to facilitate the change of speeds in the transmission.

What is claimed is:

1. In a milling machine transmission and control mechanism, having a prime mover, a change speed transmission, a friction clutch connecting driving power from said prime mover to said transmission, speed changing mechanism for said transmission including a first manual control means, clutch operating mechanism for variably controlling the engagement of said clutch including a second manual control means, and fluid pressure interlocking and control mechanism between said speed changing mechanism and said clutch operating means rendered effective by the manipulation of said first manual control means to automatically cause said friction clutch to be slippingly engaged for slow rotation of said change speed transmission by said prime mover.

2. In a milling machine transmission and control mechanism comprising a prime mover, a change speed transmission, a friction clutch for connecting driving power from said prime mover to said transmission, speed changing mechanism for said transmission, manual control means for said speed changing mechanism, clutch actuating means, manual control means for said clutch actuating means, a hyraulic actuator controlled by each of said manual control means, and hydraulic interlocking mechanism associated with said hydraulic actuators to cause said manual control means for the speed changing device to be maintained in an inoperative position upon movement of manual control means for the clutch to fully engage the clutch.

3. In a milling machine transmission and control mechanism having a prime mover, a change speed transmission, a clutch interconnecting said prime mover and transmission, a speed changing mechanism including a speed change control lever operable to neutral or operative positions, a fluid pressure actuator connected to said lever, a clutch mechanism including a clutch and a control lever therefor operable to effect disengaged, semi-engaged, and fully engaged positions of said clutch, a fluid pressure actuator for said clutch control lever, a hydraulic interlocking mechanism between said actuators rendered operative by the movement of said speed change control lever to an operative position to automatically shift said clutch to a semi-engaged position for slow rotation of said transmission by said prime mover to facilitate making speed changes in said transmission.

4. In a milling machine transmission and control mechanism having a prime mover, a change speed transmission, a clutch interconnecting said prime mover and transmission, a speed changing mechanism including a speed change control lever operable to neutral or operative positions, a fluid pressure actuator connected to said lever, a clutch mechanism including a clutch and a control lever therefor operable to effect disengaged, semi-engaged, and fully engaged positions of said clutch, a fluid pressure actuator for said clutch control lever, a hydraulic interlocking mechanism between said actuators rendered operative by the movement of said clutch control lever to a fully engaged position to automatically move said speed change control lever to and lock it in said neutral position.

5. In a milling machine transmission and control mechanism having a primer mover, a change speed transmission, a clutch interconnecting said prime mover and transmission, a speed changing mechanism including a speed change control lever operable to neutral or operative positions, a fluid pressure actuator connected to said lever, a clutch mechanism including a clutch and a control lever therefor operable to effect disengaged, semi-engaged, and fully engaged positions of said clutch, a fluid pressure actuator for said clutch control lever, a hydraulic interlocking mechanism between said actuators rendered operative by the movement of said speed change control lever to an operative position to cause said clutch control lever to be moved to and locked in its semi-engaged position.

6. In a milling machine transmission and control mechanism including a prime mover, a shiftable gear change speed transmission, a friction clutch between said prime mover and said transmission, hydraulically operated gear shifting mechanism for said transmission including a gear shifting lever operable to neutral or speed changing positions, a hydraulic servo-control mechanism for said clutch including a clutch control lever movable to a disengaged, semi-engaged, or fully engaged position of said clutch, a hydraulic actuator for each of said levers, and hydraulic interlocking mechanism associated with said actuators to limit the operation of said levers to a predetermined sequential relationship so that the movement of said gear shifting lever to a speed changing position automatically causes said clutch operating lever to be automatically moved to a semi-engaged position of said clutch for slow rotation of said transmission during gear shifting.

7. In a milling machine having a variable speed shiftable gear transmission, a power operable speed changing transmission for shifting said gears, a power actuated driving member, and a driven member forming part of said gear transmission, the combination of means for establishing a motion transmitting relationship between said members at either a one-to-one driving ratio or less than one-to-one driving ratio including an actuating lever, a control member having a neutral position and motion transmitting positions on either side thereof for causing power operation of said speed change mechanism, and means responsive to movement of said control member to either motion transmitting position to cause adjustment of said actuating lever to establish a less than one-to-one driving ratio between said driving and driven members whereby the transmission will be slowly rotated during speed changes therein.

8. In a milling machine having a variable speed shiftable gear transmission for driving a cutter spindle thereon, a power operable speed changing mechanism for shifting said gears, a power actuated driving member, and a driven member forming part of said transmission, the combination of means adjustable for establishing a motion transmitting relationship between said members at either a one-to-one driving ratio or less than one-to-one driving ratio including an actuating lever, a control lever for said speed change mechanism having neutral and operative positions, a valve connected for movement by said actuating lever and having a source of pressure connected thereto, and means rendered effective by said valve upon movement in response to movement of the actuating lever to a one-to-one driving ratio effecting position for hydraulically locking said control lever in its neutral position.

9. In a milling machine having a variable speed shiftable gear transmission for driving a cutter spindle thereof, a power operable speed changing mechanism for shifting said gears, a power actuated driving member, and a driven member forming part of said transmission, the combination of means adjustable for establishing a motion transmitting relationship between said members at either a one-to-one driving ratio or less than one-to-one driving ratio including an actuating lever, a control lever for said speed change mechanism having neutral and operative positions, a valve connected for movement by said control lever for connecting a source of pressure for hydraulically locking said actuating lever in a less than one-to-one driving ratio position whereby said transmission will be slowly rotated during speed changes therein.

10. In a milling machine having a prime mover, a variable speed spindle transmission and a clutch for connecting the prime mover to the transmission, the combination with a power operable speed change mechanism for said transmission including a control lever having stop and operative positions for controlling said mechanism and a second control lever for controlling said clutch, of a servo-motor mechanism for effecting engagement of said clutch dependent on the amount of movement of said second lever, hydraulically actuated mechanism effective on said servo-motor mechanism for positioning and holding said clutch in a partially engaged condition to effect slow rotation of said transmission, and valve means operable by the first-named control lever for connecting pressure to said hydraulically actuated means upon movement of said lever to one of its operative positions.

11. In a milling machine having a prime mover, a variable speed spindle transmission and a clutch for connecting the prime mover for actuation of the spindle, the combination with a power operable change speed mechanism for said transmission, of a speed change control lever therefor having neutral and operative positions, a valve piston member connected to said lever, a spindle control lever for controlling said clutch having a stop position, a second position for effecting partial engagement of said clutch, and a third position for effecting full engagement of said clutch, a second valve piston member connected to the spindle control lever, and hydraulic circuit connections between said piston members whereby movement of the first named control lever from its neutral position will actuate the second piston member to a position causing semi-engagement of said clutch, or movement of the spindle control lever to its third position will cause shifting of the first-named piston member to a position locking the speed change control lever in its neutral position.

FRED A. HASSMAN.
EDGAR D. VANCIL.

REFERENCES CITED

The following references are of record in the file of this patent:

UNITED STATES PATENTS

| Number | Name | Date |
|---|---|---|
| 1,170,121 | Smelser | Feb. 1, 1916 |
| 1,361,195 | Stenberg | Dec. 7, 1920 |
| 1,588,004 | Blood | June 8, 1926 |
| 1,665,825 | Stevens | Apr. 10, 1928 |
| 1,666,781 | Kaser | Apr. 17, 1928 |
| 1,778,970 | Cotta et al. | Oct. 21, 1930 |
| 1,930,059 | Muller | Oct. 10, 1933 |
| 1,938,780 | Nenninger et al. | Dec. 12, 1933 |
| 2,110,173 | Pohl et al. | Mar. 8, 1938 |
| 2,156,118 | Kliesrath | Apr. 25, 1939 |
| 2,164,884 | Nenninger et al. | July 4, 1939 |
| 2,167,790 | Whitehead et al. | Aug. 1, 1939 |
| 2,177,011 | Whitehead | Oct. 24, 1939 |
| 2,240,973 | Armitage | May 6, 1941 |
| 2,345,171 | Armitage et al. | Mar. 28, 1944 |
| 2,354,596 | Jandasek | July 25, 1944 |

FOREIGN PATENTS

| Number | Country | Date |
|---|---|---|
| 442,843 | Great Britain | May 10, 1934 |
| 462,803 | Great Britain | July 20, 1936 |
| 850,156 | France | Feb. 10, 1939 |